United States Patent [19]

Chew et al.

[11] 4,064,225
[45] Dec. 20, 1977

[54] METHOD FOR PRODUCING HYDROGEN OR DEUTERIUM FROM STORABLE SOLID PROPELLANT COMPOSITIONS BASED ON COMPLEX METAL BORON COMPOUNDS

[75] Inventors: William M. Chew; Orval E. Ayers; James A. Murfree; Pasquale Martignoni, all of Huntsville, Ala.

[73] Assignee: The United States of America as represented by the Secretary of the Army, Washington, D.C.

[21] Appl. No.: 741,590

[22] Filed: Nov. 15, 1976

Related U.S. Application Data

[62] Division of Ser. No. 669,064, March 22, 1976.

[51] Int. Cl.$^2$ .............................. C01B 1/02; C01B 4/00
[52] U.S. Cl. ................................ 423/648 R; 423/279; 423/648 A; 423/290; 423/607
[58] Field of Search .................... 423/648, 648 A, 290, 423/279, 607

[56] References Cited

U.S. PATENT DOCUMENTS

| | | | |
|---|---|---|---|
| 3,734,863 | 5/1973 | Beckert et al. | 423/648 X |
| 3,948,699 | 4/1976 | Ayers et al. | 149/22 |

*Primary Examiner*—Edward Stern
*Attorney, Agent, or Firm*—Nathan Edelberg; Robert P. Gibson; Jack W. Voigt

[57] ABSTRACT

Disclosed are storable solid propellant compositions based on complex metal boron compounds of the general formula $M(BH_4)_x$ or $M(BD_4)_x$, (where M equals a metal and $x$ equals the valence of the metal M; M is an alkali metal or an alkaline earth metal; H is hydrogen, and D is deuterium) and ammonium salts of the general formula $(NH_4)_nY$ or deuteroammonium salts of the general formula $(ND_4)_nY$ (where Y represents an anion with a total charge of $n$; N is nitrogen, H is hydrogen, and D is deuterium) combined stoichiometrically or in varying molar ratios. The stoichiometric blend is employed in a method for producing hydrogen or deuterium that contains nitrogen as an inert diluent and is acceptable for use in HF/DF chemical lasers, the gas dynamic laser (GDL), or as a source to generate hydrogen containing an inert diluent.

3 Claims, No Drawings

METHOD FOR PRODUCING HYDROGEN OR DEUTERIUM FROM STORABLE SOLID PROPELLANT COMPOSITIONS BASED ON COMPLEX METAL BORON COMPOUNDS

DEDICATORY CLAUSE

The invention described herein may be manufactured, used, and licensed by or for the Government for Governmental purposes without the payment to us of any royalties thereon.

CROSS-REFERENCE TO RELATED APPLICATION

This is a division of application Ser. No. 669,064, filed Mar. 22, 1976.

BACKGROUND OF THE INVENTION

This invention relates to the laser fuels, hydrogen or deuterium, and to solid propellant compositions from which the fuels can be produced.

Hydrogen gas contained in compressed gas cylinders has been widely used in industry as a source of hydrogen for many industrial processes and has been considered and evaluated as a fuel for chemical lasers. However, the handling of high pressure hydrogen gas or hydrogen under cryogenic conditions is not desirable from a logistic consideration for use in a mobile chemical laser system. Thus, it would be desirable to have a storable solid propellant composition that can be employed in a method to yield either hydrogen or a mixture of hydrogen and low molecular weight inert gases. Also this propellant should be based on a self-sustaining chemical reaction once the reaction is initiated. Therefore, a desirable method is one that includes a reaction initiation step which does not introduce deactivating species or undesirable contaminants with the liberated hydrogen.

Therefore, an object of this invention is to produce a solid propellant composition that is employed in a method for generating hydrogen or a mixture of hydrogen and nitrogen for use in the HF/DF chemical laser (hydrogen fluoride/deuterium fluoride chemical laser).

Another object of this invention is to provide a composition and a method for generating deuterium or a mixture of deuterium and nitrogen for use in chemical lasers.

SUMMARY OF THE INVENTION

A predetermined amount of a complex metal borohydride of the general formula: $M(BH_4)_x$ or $M(BD_4)_x$, (where M equals a metal and $X$ equals the valence of the metal M; M is an alkali metal or an alkaline earth metal; H is hydrogen, and D is deuterium) and a predetermined amount of an ammonium salt of the general formula $(NH_4)_nY$ or a predetermined amount of a deuteroammonium salt of the general formula $(ND_4)_nY$ (where Y represents an anion with a total charge $n$, preferably, Y is $SO_4$ or $Cr_2O_7$ with a charge of 2; N is nitrogen, H is hydrogen, and D is deuterium) are combined either stoichiometrically or in varying molar ratios to form a mixture by mixing in a mixer or blending mill designed for mixing powders until a uniform mixture is obtained. The uniformly mixed powder is then compacted by dead pressing into pellets or into metal canisters with a press using pressures of at least 500 pounds total load and up to about 10,000 pounds total load. The pellets or canisters can be made in any diameter and length to produce small or large volumes of gas. Total volume of gas per second being evolved is determined by the diameter of the propellant grain and its burning rate.

Initiation of reaction of produce the desired gas is accomplished by using a nickel-chromium ignition wire (80% nickel and 20% chromium). The desired gas to be generated is determined by selection of the appropriate propellant. For example, when deuterium gas or a mixture of deuterium and nitrogen is desired, a complex metal borodeuteride and deuterated ammonium salt are employed in the reaction in place of a complex metal borohydride and hydridic ammonium salt.

DESCRIPTION OF THE PREFERRED EMBODIMENTS

The following specific examples illustrate this invention and preferred embodiments used for generation of hydrogen or a mixture of hydrogen and nitrogen. The molar concentration of reactants either in a stoichiometric amount or in a near stoichiometric amount yields the highest percent hydrogen and less nitrogen or trace amount of ammonia.

SPECIFIC EXAMPLE I 2.28 g $NaBH_4$ are weighed out and mixed with 2.0 g of $(NH_4)_2SO_4$. The mixture is then uniformly blended in a small blending mill. Using a hydraulic press and approximately 1 inch diameter die, the powder is pressed into a pellet under 2000 pounds total load. The pellet is then placed in a reaction vessel which can be purged by evacuation or by an inert gas (e.g. nitrogen) to remove substantially all air and water vapor. For yield determinations, the vessel should have a known volume and should be fitted with a pressure gauge. Inside the vessel the pellet is rested on or placed in direct contact with a nickel-chromium ignition wire (80% nickel and 20% chromium), to which 10 volts at about 10 amperes are applied to produce enough heat to initiate a reaction in the pellet which is self-sustaining, once started. After the pellet reacts and the vessel is cooled to room temperature, the pressure is recorded and the amount of hydrogen and nitrogen mixture is calculated using the known volume, pressure, and temperature. Samples of the product gases may be analyzed for hydrogen, helium, oxygen, nitrogen, and ammonia using the standard techniques of gas-solid or gas-liquid chromatography.

The above formulation contains $NaBH_4$ and $(NH_4)_2SO_4$ in a 4 to 1 molar ratio. This formulation produces approximately 830 ml gas at STP per gram of propellant which was analyzed to contain 90% hydrogen and 10% $N_2$ and $NH_3$. The $NaBH_4/(NH_4)_2SO_4$ molar ratio can be varied from 2/1 to 6/1. At the lower ratios the gas mixture contains more nitrogen than at the higher molar ratios. A 4/1 molar ratio appears to be the optimum ratio for these reactants to produce the greatest hydrogen yield. The 4/1 molar ratio is based on the following reaction equation No. 1:

REACTION EQUATION 1

$$4NaBH_4 + (NH_4)_2SO_4 \rightarrow 2NaBO_2 + 2BN + Na_2S + 12H_2$$

The Reaction Equation 1 produces hydrogen gas at about 650° C. The higher temperature would offer advantages for direct utilization or production of gases at a high temperature and pressure for incremental utilization. The system where used should be constructed of materials having the design suitable for this reaction which produces effluent gas in this temperature range.

Reaction Equation No. 2 represents the production of deuterium gas from the stoichiometric amounts of the reactants specified.

REACTION EQUATION 2

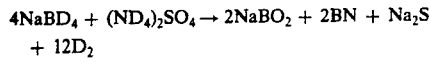

For a lower temperature hydrogen gas the reactants specified under Specific Example II yield a hydrogen gas at about 240° C. Again the advantage of the lower temperature gas as generated can be utilized in the selection and design of a system constructed of materials that would not have to meet high temperature requirements.

SPECIFIC EXAMPLE II

A pellet containing 2.65 g $NaBH_4$ and 5.04 g $(NH_4)_2Cr_2O_7$ was prepared as in Specific Example I. It was fired as in Specific Example I under similar conditions. This formulation contains $NaBH_4$ and $(NH_4)_2Cr_2O_7$ in a 7/2 molar ratio. This formulation produces approximately 700 ml gas at STP per gram of propellant which was analyzed to contain 94% hydrogen and 6% $N_2$ and $NH_3$. The molar ratio of these reactants can be varied from the 7/2 ratio to produce varying amounts of hydrogen and nitrogen. The 7/2 molar ratio which produces the greatest hydrogen yield is based on the following Reaction Equation No. 3.

REACTION EQUATION 3

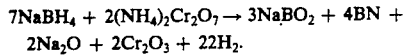

When a deuteroammonium salt is used reaction equation No. 4 as follows:

REACTION EQUATION 4

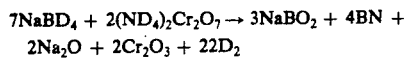

The production of hydrogen by equation No. 1 reaction shows a somewhat greater theoretical weight yield than the production of hydrogen by equation No. 3 reaction. Each reaction, however, produces 3 or more moles of hydrogen gas for each mole of the complex metal boron compound illustrated. Since the reaction temperatures do vary between the reaction equations 1 and 3, the type residual clinker would vary somewhat. In either reaction the residual clinker does remain intact and in a form that proposes no problem that is detrimental to a laser system. Of upmost consideration, the ratio of reactants should be adjusted to achieve a steady self-sustaining reaction once the reaction is initiated. The specified ranges of the reactant material achieves the desired results which include a high yield of hydrogen and a residual clinker which does not melt under the conditions or add contaminants to the reaction vessel and system where used.

The self-sustaining reaction of the complex metal borohydride and the ammonium salt (e.g. $(NH_4)_2SO_4$, $(NH_4)_2Cr_2O_7$), which results in a high yield of hydrogen, is unexpected since such ammonium salts would not be expected to be reactive as described, particularly to undergo a selfsustaining reaction after reaction initiation which continues until the propellant charge is used up when the reaction is completed.

The propellants and method of this invention are not limited to producing hydrogen or deuterium for use in the various laser systems, but may be used to generate fuel hydrogen or deuterium for other uses. Other known uses or contemplated uses would include hydrogen gas for fuel cell use, hydrogen gas as an expulsion gas for control purposes of in-flight rocket vehicles, hydrogen gas as a coolant in nuclear reactor systems, and hydrogen gas as a reducing gas for laboratory or industrial use. The hydrogen gas could be generated on an incremental basis as may be needed for the various contemplated uses or it may be employed in a system which requires hydrogen under high pressure. In the latter case, the predetermined quantity of reactants could be added to a reactant chamber where the reaction could be initiated whereby the hydrogen gas could be expelled to a storage-pressure vessel. The pressure vessel could be drawn from continuously or incrementally until the pressure is exhausted or until the pressure drops to a predetermined pressure value required for effective use. Of potential and particular advantage would be the hydrogen gas system of this invention in combination with a space vehicle using a nuclear reactor which by design has a high heat source. The hydrogen gas could be used to absorb heat as a coolant or it could be used to absorb a high quantity of heat after which the hydrogen can be ejected as a propulsion gas for propelling a space vehicle by the monopropellant action of hydrogen or the high temperature hydrogen could be combined with an oxidizer to yield gases for propelling a space vehicle by a bipropellant system.

We claim:

1. A method for producing hydrogen or deuterium having a temperature from about 240° C to about 650° C from an initiated reaction that is self-sustaining, said method comprising:

i. combining a stoichiometric amount of a first reactant compound which is a complex metal boron compound selected from the complex metal boron compounds of the general formula $M(BH_4)_x$ or $M(BD_4)X$, wherein M is a metal selected from the group consisting of an alkali metal or an alkaline earth metal and x equals the valence of said metal, H is hydrogen, and D is deuterium, and a second reactant compound which is an ammonium salt selected from the ammonium salts of the general formula $(NH_4)_2Y$ or a deuteroammonium salt selected from the deuteroammonium salts of the general formula $(ND_4)_2Y$, wherein Y in said ammonium salt and Y in said deuteroammonium salt represent the anion $Cr_2O_7$;

ii. mixing to achieve a uniform mixture of said first reactant compound and said second reactant compound;

iii. forming said mixture into a pellet by pressing in a die while using a pressure from about 500 pounds total load up to about 10,000 pounds total load;

iv. placing said pellet in a sealable combustion apparatus adapted for operating under vacuum or pressure, said pellet being placed in direct contact with an ignition wire comprised of 80 weight percent nickel and of 20 weight percent chromium;

v. purging said combustion apparatus by evacuation or by purging with an inert gas to remove substantially all air and water vapor; and thereafter, vi. supplying an amount of electrical energy to produce sufficient heat to initiate a reaction which is a self-sustaining reaction whereby said hydrogen or deuterium is produced until said reaction is completed.

2. The method of claim 1 wherein said amount of electrical energy supplied is equivalent to about 10 volts at about 10 amperes; said first reactant compound $M(BH_4)_x$ is $NaBH_4$; said second reactant compound $(NH_4)_2Y$ is $(NH_4)_2Cr_2O_7$; and wherein said reactant compounds yield said hydrogen.

3. The method of claim 1 wherein said amount of electrical energy supplied is equivalent to about 10 volts at about 10 amperes; said first reactant compound $M(BD_4)_x$ is $NaBD_4$; said second reactant compound $(ND_4)_2Y$ is $(ND_4)_2Cr_2O_7$ and wherein said reactant compounds yield said deuterium.

* * * * *